United States Patent
Bertin

(10) Patent No.: US 7,216,809 B2
(45) Date of Patent: May 15, 2007

(54) APPLIANCE WITH AN IC CARD READER AND OVERLOAD PROTECTION

(75) Inventor: Jean-Pierre Bertin, Guemene-Penfao (FR)

(73) Assignee: Thomson Licensing, Boulogne-Billancourt (FR)

(*) Notice: Subject to any disclaimer, the term of this patent is extended or adjusted under 35 U.S.C. 154(b) by 0 days.

(21) Appl. No.: 10/525,056

(22) PCT Filed: Aug. 8, 2003

(86) PCT No.: PCT/EP03/08877

§ 371 (c)(1),
(2), (4) Date: Feb. 18, 2005

(87) PCT Pub. No.: WO2004/019259

PCT Pub. Date: Mar. 4, 2004

(65) Prior Publication Data

US 2005/0247785 A1    Nov. 10, 2005

(30) Foreign Application Priority Data

Aug. 21, 2002   (EP)   ................................. 02292063

(51) Int. Cl.
*G06K 7/06* (2006.01)
(52) U.S. Cl. ................... 235/441; 235/380; 235/492
(58) Field of Classification Search ................. 235/441, 235/492, 380, 487
See application file for complete search history.

(56) References Cited

U.S. PATENT DOCUMENTS 4,785,166 A * 11/1988 Kushima ............... 235/441
5,969,329 A * 10/1999 Vallat ..................... 235/475
6,027,029 A *  2/2000 Kim ....................... 235/492

(Continued)

FOREIGN PATENT DOCUMENTS

EP         363871        4/1990

(Continued)

OTHER PUBLICATIONS

Search Report dated Jan. 19, 2004.

*Primary Examiner*—Thien M. Le
*Assistant Examiner*—Edwyn Labaze
(74) *Attorney, Agent, or Firm*—Joseph J. Laks; Harvey D. Fried; Patricia Verlangieri

(57) ABSTRACT

The appliance comprises an IC card reader for an operation with an IC card and a power supply for providing a supply voltage, in particular for the IC card. The appliance comprises further an overload protection circuit, which simulates an IC card extraction in case of an overload of the supply voltage. The power supply is then immediately switched off to avoid any damage for the power supply. In a preferred embodiment, the IC card reader is equipped with a card presence switch for indicating to a micro-controller of the appliance, that an IC card has been inserted into the card reader. The micro-controller provides then a control signal for switching on the power supply for the operation with the IC card. The protection circuit is coupled between the supply voltage for the IC card and the signal line of the card presence switch and provides a detection of a short circuit. The protection circuit may comprise a diode, a comparator or a transistor, which switches off the power supply via a logic circuit.

9 Claims, 2 Drawing Sheets

U.S. PATENT DOCUMENTS

Figure 1:
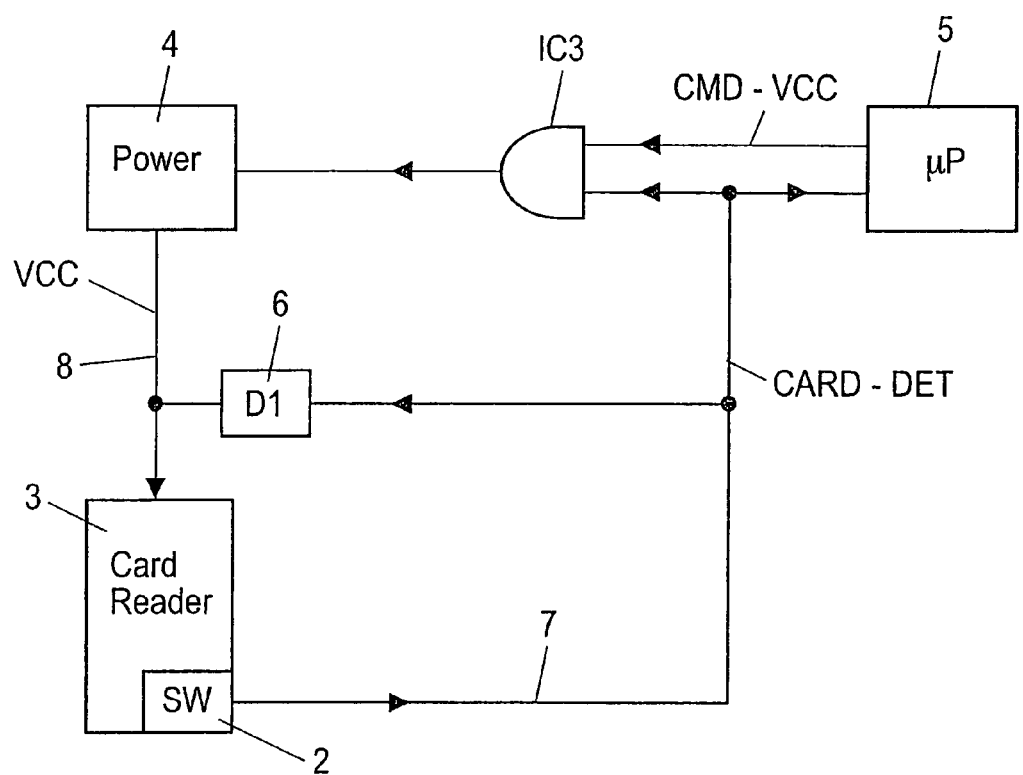

| | | | |
|---|---|---|---|
| 6,271,675 B1* | 8/2001 | Sakaki | 324/756 |
| 6,318,632 B1* | 11/2001 | Grant et al. | 235/441 |
| 6,474,558 B1* | 11/2002 | Reiner | 235/492 |
| 6,484,946 B2* | 11/2002 | Matsumoto et al. | 235/492 |
| 6,621,720 B1* | 9/2003 | Devin et al. | 363/59 |
| 2003/0075599 A1* | 4/2003 | Takatsuki et al. | 235/380 |
| 2005/0218228 A1* | 10/2005 | Chang et al. | 235/441 |

FOREIGN PATENT DOCUMENTS

| | | |
|---|---|---|
| EP | 862261 | 9/1998 |
| WO | WO 97/23840 | 7/1997 |

* cited by examiner

APPLIANCE WITH AN IC CARD READER AND OVERLOAD PROTECTION

This application claims the benefit, under 35 U.S.C. §365 of International Application PCT/EP03/08877, filed Aug. 8, 2003, which was published in accordance with POT Article 21(2) on Mar. 4, 2004 in English and which claims the benefit of European patent application No. 02292063.1, filed Aug. 21, 2002.

The present invention relates to an appliance having an IC card reader for operation with an IC card. Appliances of this kind are known for example from pay television broadcast (pay TV), electronic payment, or banking services.

IC cards, also known as smart cards, are portable information media, having the size of about a credit card. They comprise an integrated card controller, or at least an integrated memory, for a data exchange with a respective appliance. A portable device of this kind is known for example from EP-A-0 633 544. As a general term for this data media the expression "IC card" will be used throughout in this description. IC cards are usually provided with contacts being mechanically contacted by an IC card reader for an electrical connection for the data exchange with the respective appliance.

The communication between IC cards and respective appliances with IC card readers is described for example in WO 97/25685 and EP-A-0 814 427. An international standard, which describes and defines IC cards having contacts and the operation procedures of IC cards, is ISO/IEC 7816-3:1997(E). This standard is used particularly for pay television systems, which use a set-top box or a digital satellite receiver with an IC card reader and respective IC cards for authorizing the reception of pay television broadcasts. The respective IC cards comprise data, which enable the set-top box to unscramble received coded video signals.

In appliances using an IC card reader, there is a possibility that a short circuit occurs, when inserting the IC card into the card reader, for example when the IC card is damaged, or when there is moisture on the IC card. Standards like ISO/IEC 7816 or EMV2000 require therefore a protection of the supply voltage against short circuits. A widely used interface IC TDA8004, made for example by Philips Semiconductors, has therefore a short circuit protection already included. This integrated circuit provides many functions and is therefore comparatively expensive.

An overcurrent protection circuit for a power supply providing an IC card with power is disclosed in U.S. Pat. No. 5,977,758. This circuit comprises a current detection circuit, which switches in case of a malfunction the power to the IC card off independently of a micro-controller.

It is an object of the invention to provide an appliance having an IC card reader and an overload protection, which provides a high reliability.

This object is achieved by an appliance as specified in claim 1. Advantageous developments of the invention are specified in the subclaims.

According to the invention, the appliance comprises an IC card reader for an operation with an IC card and a power supply for providing a supply voltage, in particular for the IC card reader. The appliance comprises further an overload protection circuit, which simulates an IC card extraction in case of an overload of the supply voltage. The power supply is then immediately switched off to avoid any damage for the power supply.

In a preferred embodiment, the IC card reader is equipped with a card presence switch for indicating to a micro-controller of the appliance, that an IC card has been inserted into the card reader. The micro-controller provides then a control signal for switching on the power supply for the operation with the IC card. Power to the IC card is therefore only provided, when a signal of the card presence switch indicates that an IC card has been inserted. In case of an overload of the supply voltage, the overload protection circuit changes the positive signal of the card presence switch to a value, which states that no IC card is present. Therefore, an extraction of the IC card is simulated.

In a further preferred embodiment, the overload protection circuit is coupled between the supply voltage for the IC card and the signal line of the card presence switch and provides a detection of a short circuit. The protection circuit may comprise a diode, a comparator or a transistor, which resets the value of the card presence switch to a value, which simulates that no IC card is present.

Advantageously, a logic circuit is used, to control the switching on and off of the power supply for the IC card. To this circuit the card presence signal and the power on/off signal from the micro-controller are coupled and the operation of the logic circuit is such, that the power supply is only switched on, when an IC card is inserted applying a positive signal from the card presence switch to the logic circuit, and when the micro-controller provides the command signal for switching on the supply voltage. Then the logic circuit switches through for turning the power to the IC card on. The logic circuit is for example an AND circuit or a NAND circuit. When a short circuit occurs, the power to the IC card is immediately switched off via the logic circuit, independently from the micro-controller. The power is therefore switched off much faster, as could be performed by the micro-controller, which reduces the danger of damaging the power supply.

Figure 2:
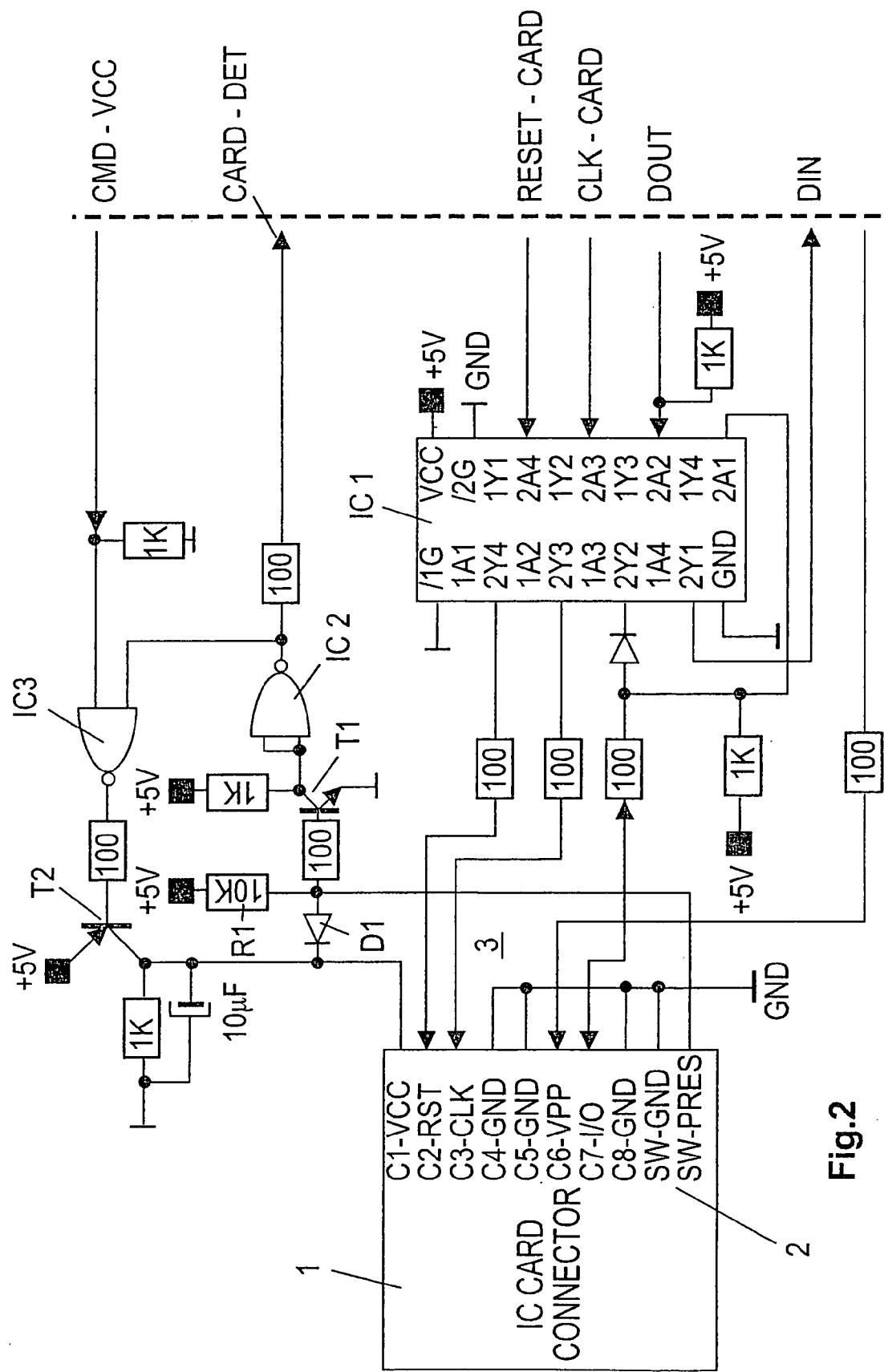

Preferred embodiments of the invention are now explained in more detail with reference to schematic drawings, which show:

FIG. 1 An appliance with an IC card reader and an overload protection circuit, and FIG. 2 an appliance with an IC card reader comprising a protection circuit against a short circuit.

The appliance shown in FIG. 1 comprises an IC card reader 3, which is powered by a power supply 4 via line 8. The IC card reader 3 comprises in particular a housing, in which a respective IC card can be inserted, and contact terminals for applying a supply voltage VCC to the IC card and for providing an exchange of digital data between the IC card and a micro-controller 5 of the appliance. The card reader 3 comprises further a card presence switch 2, which provides a signal "CARD-DET" via a signal line 7 to the micro-controller 5, when an IC card is inserted. The card presence switch 2 is a mechanical switch, which is operated, when an IC card is inserted. If an IC card is inserted, the switch 2 is opened. Via a respective circuitry, as explained with regard to FIG. 2, a logical "HIGH" signal, "CARD-DET", is provided then to the micro-controller 5.

According to the invention, an overload protection circuit 6 is coupled between the line 8 of the supply voltage VCC and the line 7 of the card detect signal, which converts in case of an overload of the supply voltage VCC the signal indicating the presence of an inserted IC card to a value, which states that no IC card is present. The overload of the supply voltage VCC simulates therefore via the protection circuit 6 an IC card extraction for switching off the power supply 4.

The power supply 4 in this embodiment is switched on and off by a logic circuit IC3, to which inputs the signal from the card presence switch 2 "CARD-DET" is applied and the power on/off signal "CMD-VCC" from the micro-controller 5. The power supply 4 is then switched on only, when a positive signal from the card presence switch 2 is provided and a power on command from the micro-controller 5. In case of an overload condition, the protection circuit 6 converts the signal from the card presence switch 2 from "CARD DETECTED" to "NO CARD PRESENT", and therefore switches off the power supply 4 immediately via the logic circuit IC3. The logic circuit IC3 is for example a NAND or an AND circuit.

The protection circuit 6 may comprise an over-current protection circuit, which measures the current of line 8 for example via a measuring resistor, and which provides a respective signal for an overload, when the current provided by the power supply 4 is too high. In another embodiment, the protection circuit 6 comprises a voltage detector for the supply voltage VCC, which uses a voltage threshold for determining a breakdown of the supply voltage VCC. This can be performed for example by a protection circuit comprising a comparator, a transistor or a diode, or by any other switching element. A supply voltage breakdown occurs for example in case of a short circuit.

In FIG. 2 a detail of a digital set-top box is shown comprising an IC card reader 3 and relevant parts for the operation of the set-top box with an IC card. The IC card reader 3 comprises an IC card connector 1 with contacts C1–C8, for operation with an IC card according to the IEC 7816-3:1997(E) standard. The contacts C1–C8 provide the following connections to an IC card: C1 for supply voltage VCC, C2 for a reset of the IC card, C3 for providing a clock signal CLK to the IC card, C4, C5 and C8 for providing ground terminal connections to the IC card, C6 (reserved for a programming voltage VPP) and C7 for providing a data input/output connection for a data exchange between the IC card and the set-top box.

The set-top box comprises further an integrated circuit IC1, a buffer and line driver for the digital signals used for operation with the IC card. The respective signals, which are coupled to the integrated circuit 1, are the reset signal "RESET-CARD" for contact C2, the clock signal "CLK-CARD" for contact C3, and data input and output signals "DOUT" and "DIN" for contact C7. The integrated circuit IC1 is for example an integrated circuit 74HCT244 from Texas Instruments. For the IC1, also for the IC card and the electronics of the IC card reader 4, a supply voltage of 5 Volts is used.

The IC card reader 3 comprises a card presence switch 2 with switch contacts SW for a detection of an IC card, when an IC card is inserted into the IC card connector 1. To one of the switch contacts, PRES, a supply voltage of 5 V is coupled via a resistor R1. When an IC card is inserted into the IC card connector 1, the switch contacts SW are open. Also a transistor T1 is coupled via its base terminal to the switch contact PRES. The transistor T1 provides therefore a "LOW" output signal, when the switch 2 is open, (IC card inserted) and a "HIGH" output signal, when the switch 2 is closed.

To the transistor T1 a NAND circuit IC2 is coupled, which is arranged as an inverter, for providing a signal "CARD-DET" for a micro-controller, not shown in FIG. 2, of the set-top box. The micro-controller is for example a "system-on-chip" controller STI5516 from ST Microelectronics. The output signal of the NAND circuit IC2 is therefore "HIGH", when an IC card is inserted. The output of IC2 is also coupled to an input of a NAND circuit IC3, for providing a supply voltage VCC to the IC card, terminal C1. To the other input of the NAND circuit IC3 a control signal "CMD-VCC" from the micro-controller is coupled. Therefore, when an IC card has been inserted and then the control signal "CARD-DET" is provided, the micro-controller provides the signal "CMD-VCC" for switching on the supply voltage VCC for the IC card. The supply voltage VCC is provided by a transistor T2, to which base terminal the output of IC3 is coupled. When the output of the NAND gate IC3 switches to "LOW", transistor T2 switches through for supplying a 5 V supply voltage VCC to the contact C1 of the IC card connector 1.

Between the line providing the supply voltage VCC to the contact C1 and the line coming from the switch contact PRES of card presence switch 2 a diode D1 is coupled, which is arranged such, that the diode D1 conducts, when the signal from the switch contact is "HIGH", but the supply voltage VCC is low. Therefore, when the supply voltage VCC breaks down when an IC card is inserted, for example when the IC card has a short circuit between respective IC card contacts, the diode D1 switches through and therefore switches off transistor T1. Then the output of NAND circuit IC2 switches to "LOW", which switches off immediately the transistor T2 via NAND circuit IC3. The transistor T2, the power supply for the IC card, is switched off therefore immediately by transistor T1 and NAND circuits IC2 and IC3, and will not be damaged by a short circuit. There is a much smaller delay, as would be the case when the transistor T2 would be switched off via the micro-controller. The diode D1 provides therefore a very effective short circuit protection.

Instead of NAND circuits IC2 and IC3, also buffer/line driver circuits with a controllable output can be used, for example integrated circuits Quad buffer/line driver 74HC125 or 74HC126, manufactured for example from Philips Semiconductors. These circuits comprise four non-inverting buffers, which outputs are controllable via a respective output enable input, the 74HC125 having active LOW enable inputs and the 74HC126 active HIGH enable inputs.

The overload protection circuit 6, FIG. 1, may be arranged also within a power supply circuit, which provides then an error signal in case of an overload. For example, an adjustable power voltage regulator LP2951 from Fairchild Semiconductor Corporation can be used, which provides an error signal in case of a low output voltage, which may occur for example in case of a short. The IC LP2951 is switched on and off via the signal CMD-VCC from micro-controller 5, see FIG. 1.

The error signal from IC LP2951 can be applied for example to the output enable input of a buffer/line driver circuit, IC 74HC125, to which input the card detected signal CARD-DET, FIG. 1, is coupled, and which output is coupled to IC3 and to the micro-controller 5. In case of an overload of the supply voltage VCC, the error signal from IC LP2951 then changes the output from the buffer/line driver circuit from positive to negative, simulating therefore an IC card extraction, which switches off the power supply 4 via IC3.

The overload protection as described is especially suited for a digital set-top box or a satellite receiver operating with an IC card, but applications for other appliances having an IC card reader for operation with an IC card are also possible. The appliance may have also further IC card readers, which are protected in the same way.

The invention claimed is:

1. An apparatus comprising:
   a micro-controller;

an IC card reader including a card presence switch, said card reader supplying an IC card detect signal to said micro-controller when an IC card is inserted into said card reader;

a power supply for providing a supply voltage to said IC card via a mechanical contact terminal of said IC card reader when said IC card is inserted into said card reader, and an overload protection circuit coupled to said supply voltage which simulates IC card extraction by switching off said supply voltage when an overload of said supply voltage occurs.

2. The apparatus according to claim 1 wherein said overload protection circuit changes said card detect signal from positive to negative when an overload of said supply voltage occurs.

3. The apparatus according to claim 2 wherein said overload protection circuit is further coupled to said card presence switch.

4. The apparatus according to claim 3 wherein said overload protection circuit comprises a diode and a component selected from the group comprising a comparator and a switch, said circuit being arranged for detecting a voltage breakdown of said supply voltage.

5. The apparatus according to claim 1 further including a switching means responsive to a supply voltage "ON/OFF" command provided by said micro-controller for switching on said power supply only when said card detected signal is positive.

6. The apparatus according to claim 5 wherein said switching means is a logic circuit gate.

7. The apparatus according to claim 1 wherein said overload protection circuit provides an error signal when an overload of said supply voltage occurs, said error signal changing via a logic circuit said card detect signal from positive to negative for simulating said IC card extraction.

8. The apparatus according to claim 1 wherein said supply voltage is a supply voltage for said IC card reader.

9. The apparatus according to claim 1 wherein said apparatus is selected from the group comprising: a digital set-top box and a digital satellite receiver, said apparatus including an IC card reader for authorizing reception of pay television broadcast.

* * * * *